United States Patent Office 3,343,627
Patented Sept. 26, 1967

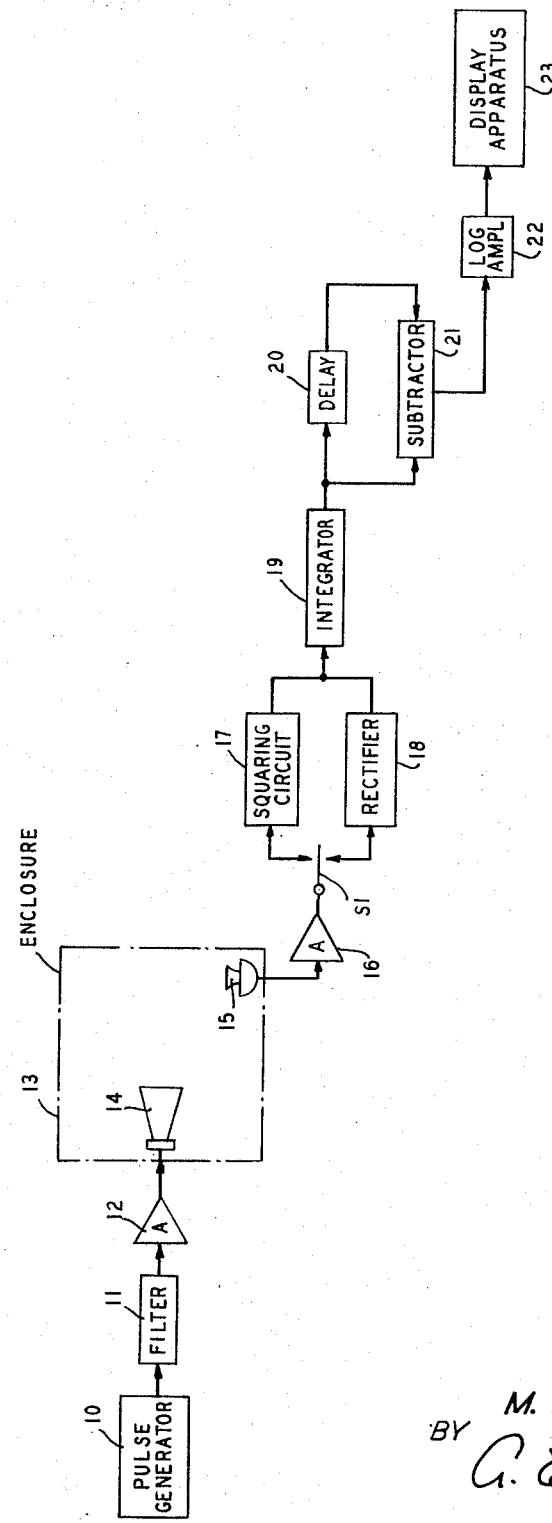

3,343,627
APPARATUS FOR AND METHOD OF DETERMINING THE ACOUSTIC PROPERTIES OF AN ENCLOSURE
Manfred R. Schroeder, Gillette, N.J., assignor to Bell Telephone Laboratories, Incorporated, New York, N.Y., a corporation of New York
Filed Mar. 16, 1966, Ser. No. 534,791
8 Claims. (Cl. 181—.5)

ABSTRACT OF THE DISCLOSURE

The use of decay curves in determining the acoustical properties of an enclosure has greatly facilitated the design of auditoriums, concert halls and other types of rooms. Decay curves obtained, however, from actual experiments fail to reveal, clearly, the acoustical properties desired because of random irregularities that appear in such curves. An ideal solution for removing random fluctuations from decay curves would be to average a sufficiently large number of decay curves themselves to obtain a single "ensemble average" decay curve. A practical equivalent to this ideal solution is obtained by generating an appropriate excitation signal and processing this signal to develop a single decay curve that is representative of the "ensemble average" over infinitely many decay curves.

This invention pertains to the determination of the response of a system to an applied excitation signal and, more particularly, to the determination of the acoustic properties of an enclosure.

In the acoustic design of enclosures such as auditoriums, concert halls, and other types of rooms, it is necessary to ascertain precisely a number of different acoustic properties. One of the most useful techniques for determining several of these acoustic properties is to obtain so-called decay curves for the enclosure under study. Such curves are obtained by generating a selected sound signal at one point in the enclosure until the sound pressure level builds up to a desired level, following which the sound excitation signal is stopped and the decay of the signal received at another selected point in the enclosure is plotted as a function of time to produce the decay curve. The details of this process are given in several well-known texts exemplified by that of L. L. Beranek entitled "Acoustic Measurements," chap. 18 (1949).

Theoretically, a decay curve should reveal several important properties of the enclosure. For example, one of the best known acoustic properties is reverberation time, which may be determined by measuring the length of time required for the sound pressure level to decay 60 decibels from its steady state value. Another important characteristic is the presence or absence of multiple decay rates, since the existence of multiple decay rates points to a lack of sound diffusion within the enclosure. Furthermore, the initial decay rate is important in determining the statistical absorption coefficient of various materials employed in the enclosure, as well as the "subjective reverberancy of the enclosure."

In practice, however, decay curves obtained from actual experiments often fail to reveal clearly the acoustic properties described above because of random irregularities or fluctuations that appear in such curves. When random noise is used as an excitation signal, part of the reason for these fluctuations is attributable to randomness in the initial amplitudes and phase angles of the noise frequency components from trial to trial; however, similar irregularities appear when other signals such as warble tones are used to excite the enclosure. As a result, different decay curves are obtained under identical physical conditions. Therefore, despite identical transmitting and receiving positions, random fluctuations within the same enclosure cause each curve to have a different variation with time. Further, the random fluctuations that appear in the different decay curves not only make it difficult to measure reverberation time with accuracy but also tend to mask the presence of multiple decay rates.

It is well known, of course, that a relatively accurate measurement of reverberation time may be obtained by plotting many decay curves under identical physical conditions and averaging the individual reverberation times of the various curves. However, in addition to the obvious inefficiency of a procedure that requires the plotting of many decay curves and the averaging of many individual measurements derived from the plotted curves, such a procedure does little to remove random fluctuations that mask multiple decay rates and the initial decay rate.

In the present invention, it is recognized that the ideal solution for removing random fluctuations from decay curves would be to average a sufficiently large number of the decay curves themselves to obtain a single "ensemble average" decay curve. It is further recognized in the present invention that there is a practical, realizable equivalent to this ideal solution in which by generating an appropriate excitation signal and by properly processing the received sound signal there is obtained a single decay curve that is representative of the ensemble average over infinitely many decay curves. Specifically, it has been determined that the ensemble average of infinitely many received signals, each raised to the second power, is identical to a certain single integral of the impulse response of the enclosure, raised to the second power.

A signal representative of the impulse response of an enclosure is obtained by exciting the enclosure with a relatively brief impulse containing energy in the frequency range of interest. In my copending application, Ser. No. 417,364, filed Dec. 10, 1964, entitled "Method of and Apparatus for Measuring Ensemble Averages and Decay Curves," now issued as Patent 3,270,833 on Sept. 6, 1966, the detection of the impulse response of an enclosure and its recording on a suitable medium, such as a magnetic tape is described. The recorded signal is then reproduced in a direction opposite to that in which it was recorded, and the reproduced reversed direction signal is raised to the second power, and integrated to develop an output signal representative of the decay characteristic of the enclosure.

It has been found that this technique is time consuming and involves the costly operation of recording and reversing apparatus. In accordance with the present invention these deficiencies are overcome. According to the invention, a detected signal representative of the impulse response of the enclosure is raised to the second power, integrated, and applied to signal delaying apparatus. The integrated squared impulse response signal of the enclosure is delayed for a predetermined interval of time. A continuous signal proportional to the difference of the instantaneous integrated signal appearing at the output of the integrator and the delayed integrated signal is developed. This difference signal is representative of the decay characteristic of the enclosure. By plotting this signal on a suitable medium, there is obtained a single, monotonic decay curve that is free from the random fluctuations discussed above and which is equivalent to the ensemble average of infinitely many decay curves obtained by repeatedly exciting the enclosure with signals having the same spectrum as the impulses of the present invention. From this single, monotonic decay curve the acoustic properties described above may be determined quickly and without ambiguity.

The invention may be more fully understood from the following description of an illustrative embodiment thereof taken in connnection with the appended drawing in which:

The single figure is a block schematic diagram of apparatus for obtaining a decay curve in accordance with the principles of this invention.

Theoretical considerations

In my aforementioned copending application it was shown that the ensemble average of infinitely many squared received signals, $<s^2(t)>$, is proportional to a selected integral of the squared impulse response, $r(x)$, of an entire enclosure system. The enclosure system is taken to include a bandpass filter, amplifiers, and transducers connected in series with the enclosure. This relationship may be expressed analytically as:

$$\frac{<s^2(t)>}{N} = \int_t^\infty r^2(x)dx \quad (1)$$

The above expression may be shown to be equivalent to the sum of two integrals, namely:

$$\int_t^\infty r^2(x)dx = \int_t^{t+T} r^2(x)dx + \int_{t+T}^\infty r^2(x)dx \quad (2)$$

If we assume, for the purpose of evaluating the contribution of the last term of Equation 2, that the impulse response, $r(x)$, approximates an exponential decay then, in accordance with the discussion on page 798 of the above-cited Beranek text $r(x)$ may be shown to be proportional to an exponential function as follows:

$$r(x) \propto \epsilon^{-\frac{6.9x}{T_{60}}} \quad (3)$$

and $$r^2(x) \propto \epsilon^{-\frac{13.8x}{T_{60}}} \quad (4)$$

where the symbol ($\propto$) means "proportional to" and $T_{60}$ refers to the reverberation time of the enclosure. If this expression for $r^2(x)$ is substituted into the last term of Equation 2, the evaluated integral may be shown to be less than or equal to:

$$\int_{t+T}^\infty \epsilon^{-\frac{13.8x}{T_{60}}} dx \leq \frac{T_{60}}{13.8} \epsilon^{-13.8 \frac{T}{T_{60}}} \quad (5)$$

If we assume that $$T \geq \frac{T_{60}}{n}$$

where $n$ may be an integer equal to 5, then the expression of Equation 5 may be shown to be less than or equal to one-fifteenth of the total integral of Equation 2, an insignificant value in the measurement of reverberation time. Therefore, we may disregard the second term of Equation 2 and base our measurement on the expression:

$$\frac{<s^2(t)>}{N} = \int_t^{t+T} r^2(x)dx \text{ where } T \geq \frac{T_{60}}{5} \quad (6)$$

This expression is equivalent to:

$$\frac{<s^2(t)>}{N} = \int_t^{t+T} r^2(x)dx = \int_0^{t+T} r^2(x)dx - \int_0^t r^2(x)dx \quad (7)$$

Thus, in accordance with the present invention, the ensemble average of infinitely many squared received signals is proportional to the difference of two specified integrals, one delayed in time with respect to the other. Of course, the divisor of $T_{60}$, namely $n$, may be greater than or less than 5 depending upon the degree of approximation desired. It has been found that in most practical applications the use of an integer approximately equal to 5 gives satisfactory results.

Apparatus

Apparatus for obtaining a single measurement of a decay curve representative of the ensemble average of infinitely many squared noise decay signals in accordance with Equations 6 and 7 is shown in the drawing. Illustrated is apparatus in which the input and output points of an enclosure system are defined to include filter 11, amplifier 12, loudspeaker 14, enclosure 13, microphone 15, and amplifier 16. An output signal representative of the impulse response of this system is obtained at the output terminal of amplifier 16 by applying a single relatively brief pulse, having a sufficiently broad spectrum, from pulse generator 10 to the input terminal of filter 11. Filter 11 may include a plurality of selectively actuated parallel connected bandpass filters as disclosed in my above-cited copending application.

The signal radiated into enclosure 13 is altered by the characteristic of the enclosure to produce, at a second selected position within enclosure 13, a received signal which, after detection by microphone 15 and passage through amplifier 16, is representative of the impulse response of the enclosure, denoted $r(x)$, in the frequency range of interest. Assuming that switch S1 is operatively connected to squaring circuit 17 the received signal is raised to the second power. Squaring circuit 17 may be any conventional device for developing an output signal whose amplitude is proportional to the squared or second power of the amplitude of an incoming signal. From circuit 17 the squared output signal is integrated within integrator 19, thereby to develop a voltage proportional to the second right hand term of Equation 7. Integrator 19 may be of any well-known variety. For example, an RC circuit has been found to be satisfactory.

Thus, at the output of integrator 19 there appears a signal which corresponds to the integral between time O and time $t$ of the squared impulse response of the enclosure. This integrated signal is applied to delay apparatus 20, which may be a delay line of any well-known type having a delay corresponding to a time, T. Thus, after a lapse of time T corresponding to the delay of apparatus 20, the integral of the squared impulse response of the enclosure between time O and time $t$ appears at the output of apparatus 20. Simultaneously therewith, because of the interval of time, T, which has elapsed, the signal appearing at the input of apparatus 20 corresponds to the integral of the squared impulse response between time O and time $t+T$. The difference between these two integrated signals, one advanced in time by an interval, T, is developed by subtractor 21 which may be of any type well known to those skilled in the art. Thus, at the output of subtractor 21 there appears a signal which is proportional to the difference of two integrals as defined by Equation 7 and which is practically equivalent to the ensemble average of infinitely many squared received signals. The required delay time T of apparatus 20 should be about 0.6 second for reverberation times up to approximately three seconds. The bandwidth of apparatus 20 should be approximately twice that of the bandwidth of the signal to be measured. For an octave frequency band centered at 6 kc. (bandwidth 4 kc.) the required bandwidth of the delay apparatus should therefore be approximately 8 kc.

It has been found that the results obtained by the practice of this invention more closely approximate the "subjective reverberancy" of an enclosure if a rectifier is used instead of a squaring circuit. Accordingly, as shown in the drawing, switch S1 may be operatively connected to rectifier 18, which may be a full-wave of half-wave rectifier of any well-known type. It is believed that a more satisfactory subjective result is obtained because this method of processing more closely approximates the actual hearing mechanism of the human ear.

To obtain a visually perceptive delay curve, the signal developed by subtractor 21 is passed through logarithmic amplifier 22 to display apparatus 23, which may be either a graphic recorder or a cathode ray oscilloscope. Of course, the signal may be directly applied to apparatus 23 if a nonlogarithmic presentation is wanted.

If desired, the enclosure system may be considered to include only enclosure 13 itself in which case the received signal at a point within the enclosure represents the impulse response thereof. In order for the received signal to represent the impulse response of the enclosure, it is necessary to excite the enclosure with a relatively brief impulse of acoustic energy; for example, a pistol shot, a clap, or some other sound burst having a relatively short duration and substantial energy over a relatively wide frequency range. A technique similar to that disclosed in my above-cited copending application may be utilized for this purpose.

The greater precision of measured reverberation times made possible by the practice of this invention will also benefit both the accuracy and reproducibility of measurements of sound absorption coefficients in reverberation chambers. In addition, because the curves developed by display apparatus 23 will make apparent the occurrences of double-sloped decays, this invention will serve as a reliable indicator of insufficient sound diffusion. Furthermore, during the initial interval of time T, after the application of the integrated signal to delay apparatus 20, the curves developed will also indicate the "build-up" of the sound pressure level in enclosure 13.

Although this invention has been described in terms of measuring the acoustic response of an enclosure, it is to be understood that the application of the principles of this invention is not limited to acoustics but includes other measurements in which excitation by noise or other sounds produces random fluctuations which tend to mask the response characteristics of the system being analyzed. In addition, it is to be understood that the above-described embodiment is merely illustrative of the numerous arrangements that may be devised by those skilled in the art without departing from the spirit and scope of the invention.

What is claimed is:

1. Apparatus for measuring automatically the sound decay characteristic of an enclosure which comprises:
 a source of an impulse of energy having a predetermined frequency range and a relatively short time duration,
 means for exciting said enclosure with said impulse of energy at a first predetermined point,
 means for detecting at a second predetermined point within said enclosure an output signal representative of the impulse response of said enclosure,
 means for selectively processing said output signal,
 means for developing a signal which is the continuous integral of said processed signal,
 means for delaying said integrated signal for a predetermined interval of time,
 means for developing a signal proportional to the difference between the continuous integral of said processed signal and said delayed integrated signal,
 and means responsive to said difference signal for developing an indication representative of the decay characteristic of said enclosure.

2. Apparatus as defined in claim 1 wherein said means for selectively processing said output signal comprises means for raising said output signal to the second power to produce a squared signal.

3. Apparatus as defined in claim 1 wherein said means for selectively processing said output signal comprises means for rectifying said signal.

4. Apparatus as defined in claim 1 wherein said means for developing an indication of the decay characteristic of said enclosure comprises a visual recorder responsive to a logarithmic amplifier.

5. The method of determining the sound decay characteristics of an enclosure which comprises the steps of:
 introducing a relatively brief impulse of energy having a spectrum covering a preselected frequency range into said enclosure at a first selected point,
 converting the sound decay due to said impulse at a second selected point within said enclosure into an electrical wave,
 computing the integral of the squared amplitude of said electrical wave to obtain a proportional first electrical signal,
 delaying said first electrical signal a predetermined interval of time,
 continuously computing the difference between said delayed signal and said first electrical signal to obtain a proportional second electrical signal,
 and plotting a decay curve from said second electrical signal.

6. In a system for computing automatically the ensemble average of the squared sound decay of an enclosure, the combination that comprises:
 means for radiating at a first selected point within said enclosure a relatively brief impulse of acoustic energy having a predetermined frequency range,
 means for detecting at a second selected point within said enclosure the sound decay due to said impulse to develop a proportional electrical signal,
 means for rectifying said electrical signal,
 means for integrating said rectified signal,
 and means for continuously developing a signal proportional to the difference between said integrated signal and a signal corresponding to the integral of said rectified signal subsequent in time by a predetermined interval.

7. Apparatus for determining the decay characteristic of an enclosure comprising:
 means for introducing an impulse of acoustic energy having a predetermined spectrum into said enclosure at a first selected point,
 means for deriving from the sound decay at a second selected point within said enclosure a proportional electrical signal,
 switching means for selectively applying said electrical signal to one of two subpaths wherein the first one of said subpaths includes rectifying means and the second one of said subpaths includes squaring means,
 means responsive to a predetermined one of said subpaths for integrating a signal conveyed thereby,
 and means for continuously developing a signal proportional to the difference between said integrated signal and a signal corresponding to the integral of said signal subsequent in time.

8. Apparatus for determining the energy decay of an energized enclosure comprising:
 means for energizing said enclosure with a brief impulse of energy,
 means for developing an electrical signal proportional to the impulse response of said enclosure,
 means for selectively altering said signal,
 means for integrating said altered signal,
 means for delaying said integrated signal for a preselected time interval,
 means for developing a signal proportional to the difference of said delayed signal and the instantaneous integral of the altered impulse response signal of said enclosure,
 and means for displaying said difference signal.

References Cited

UNITED STATES PATENTS 3,270,833  9/1966  Schroeder _____ 181—.5

RODNEY D. BENNETT, *Primary Examiner.*

SAMUEL FEINBERG, *Examiner.*

M. F. HUBLER, *Assistant Examiner.*